(12) United States Patent
Lee et al.

(10) Patent No.: US 9,116,979 B2
(45) Date of Patent: Aug. 25, 2015

(54) SYSTEMS AND METHODS FOR CREATING AN INTEREST PROFILE FOR A USER

(75) Inventors: Hyun Chul Lee, Thornhill (CA); Yingbo Miao, Toronto (CA); Liqin Xu, Markham (CA)

(73) Assignee: Rogers Communications Inc., Toronto, Ontario (CA)

( * ) Notice: Subject to any disclaimer, the term of this patent is extended or adjusted under 35 U.S.C. 154(b) by 206 days.

(21) Appl. No.: 13/309,661

(22) Filed: Dec. 2, 2011

(65) Prior Publication Data

US 2012/0330975 A1 Dec. 27, 2012

Related U.S. Application Data

(60) Provisional application No. 61/500,115, filed on Jun. 22, 2011.

(51) Int. Cl.
*G06F 17/30* (2006.01)

(52) U.S. Cl.
CPC .... *G06F 17/30702* (2013.01); *G06F 17/30029* (2013.01); *G06F 17/30598* (2013.01); *G06F 17/30864* (2013.01)

(58) Field of Classification Search
CPC .............. G06F 17/30864; G06F 17/30598; G06F 17/30029; G06F 17/30705; G06F 17/30713; G06F 17/30702
USPC ................................. 707/749, 732, 733, 734
See application file for complete search history.

(56) References Cited

U.S. PATENT DOCUMENTS

| | | | | |
|---|---|---|---|---|
| 5,754,938 | A * | 5/1998 | Herz et al. ................... | 725/116 |
| 6,385,619 | B1 * | 5/2002 | Eichstaedt et al. ............ | 707/748 |
| 6,460,036 | B1 * | 10/2002 | Herz ............................ | 707/748 |
| 6,757,691 | B1 * | 6/2004 | Welsh et al. .................. | 1/1 |
| 6,763,349 | B1 * | 7/2004 | Sacco ........................... | 1/1 |
| 7,444,319 | B1 * | 10/2008 | Sathyanarayan ............. | 1/1 |
| 7,734,641 | B2 * | 6/2010 | Kanigsberg et al. .......... | 707/765 |
| 2001/0037324 | A1 | 11/2001 | Agrawal et al. | |
| 2002/0173971 | A1 * | 11/2002 | Stirpe et al. .................. | 705/1 |
| 2005/0108200 | A1 | 5/2005 | Meik et al. | |
| 2006/0224552 | A1 * | 10/2006 | Riezler et al. ................ | 707/1 |
| 2008/0028036 | A1 * | 1/2008 | Slawson et al. ............... | 709/217 |
| 2008/0114756 | A1 * | 5/2008 | Konig et al. ................. | 707/5 |

(Continued)

OTHER PUBLICATIONS

EPO, Extended European Search Report relating to Application No. 11868031.3, dated Feb. 17, 2015.

(Continued)

*Primary Examiner* — Thanh-Ha Dang
(74) *Attorney, Agent, or Firm* — Rowand LLP (57) ABSTRACT

Profiling systems and methods of creating and using user interest profiles are described. In some example embodiments, the method includes: creating a topic set which includes topics which are organized in a hierarchical structure which includes a plurality of topic levels including an upper topic level and a lower topic level, each topic in the lower topic level being a subtopic of at least one of the topics in the upper topic level; monitoring interest in a plurality of documents for a user to identify one or more documents-of-interest to the user; and based on the monitored interest for the user, creating an interest profile for the user by determining a measure of topical interest for the user for at least one of the topics at the upper topic level and for a subtopic of that topic, the subtopic being at the lower topic level.

23 Claims, 6 Drawing Sheets

(56) References Cited

U.S. PATENT DOCUMENTS

| | | | |
|---|---|---|---|
| 2009/0012955 A1* | 1/2009 | Chu et al. | 707/5 |
| 2009/0248494 A1* | 10/2009 | Hueter et al. | 705/10 |
| 2010/0030713 A1* | 2/2010 | Simpson et al. | 706/11 |
| 2010/0191742 A1 | 7/2010 | Stefik et al. | |
| 2010/0250341 A1* | 9/2010 | Hauser | 705/10 |
| 2011/0043652 A1 | 2/2011 | King et al. | |
| 2011/0066615 A1 | 3/2011 | Pradhan et al. | |
| 2011/0119264 A1 | 5/2011 | Hu et al. | |
| 2012/0072291 A1* | 3/2012 | Bharat | 705/14.66 |
| 2012/0089621 A1* | 4/2012 | Liu et al. | 707/749 |
| 2012/0166435 A1* | 6/2012 | Graham et al. | 707/728 |
| 2012/0215844 A1* | 8/2012 | Ferlez et al. | 709/204 |
| 2012/0317102 A1* | 12/2012 | Hu et al. | 707/723 |
| 2012/0324004 A1* | 12/2012 | Le et al. | 709/204 |
| 2013/0006978 A1* | 1/2013 | Cierniak et al. | 707/728 |
| 2013/0013644 A1* | 1/2013 | Sathish et al. | 707/792 |
| 2013/0227020 A1* | 8/2013 | Ruffner et al. | 709/204 |
| 2014/0089289 A1* | 3/2014 | Moitra et al. | 707/709 |

OTHER PUBLICATIONS

Godoy et al.: Personal Searcher: An Intelligent Agent for Searching Web Pages, Lecture Notes in Computer Science, Jan. 1, 2000, XP055168256.

Kim et al.: "Learning implicit user interest in hierarchy for context in personalization", Applied Intelligence; The International Journal of Artificialintelligence, Neural Networks, and Complex Problem-Solving TE, Kluwer Academic Publishers, BO, vol. 28, No. 2, Jun. 6, 2007, XP019569291.

International Search Report dated Mar. 6, 2012, PCT/CA2011/050744.

CIPO, CA Office Action relating to Application No. 2,832,902, dated Mar. 24, 2015.

* cited by examiner

SYSTEMS AND METHODS FOR CREATING AN INTEREST PROFILE FOR A USER

CROSS-REFERENCE TO RELATED APPLICATION

This application claims the benefit of and priority to U.S. Provisional Patent Application No. 61/500,115 filed Jun. 22, 2011 under the title SYSTEM AND METHOD FOR PERSONALIZING DIGITAL CONTENT The content of the above patent application is hereby expressly incorporated by reference into the detailed description hereof.

TECHNICAL FIELD

The present disclosure relates generally to user profiling. More specifically, it relates to methods and systems for predicting user interest in a document.

BACKGROUND

Systems which provide users with access to a large volume of documents are sometimes required to select a subset of the documents for display to a user. For example, since displays are of a limited size, it is sometimes necessary to select only a portion of all available documents for display to a user.

Similarly, it is often necessary to prioritize documents for display to user since a user's attention span and available time may be limited. That is, it may be necessary or desirable to display documents which are of a higher priority higher in a list than other documents which are of a lower priority. Typically, systems attempt to display documents which are likely to be more interesting at a higher position than documents which are likely to be less interesting.

The problem of selecting and prioritizing documents is a problem which may arise, for example, with search engine systems which index a large volume of documents. Users are more likely to view search results which are displayed more highly in a list of search results. Accordingly, it may be desirable to select and prioritize search results so that results which are displayed more highly are results which are likely to be useful to a user.

Similarly, news aggregation systems may be required to select and prioritize documents. News aggregation systems and websites may analyze content from various sources and may provide access to that content through a common portal. Since news aggregation systems and websites index content from many different sources, the number of stories and documents which are indexed by such systems and websites may be quite large. Accordingly, news aggregation systems may select and prioritize documents in order to provide users with access to documents which may be of interest to such users.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

In one aspect, the present disclosure provides a method implemented by a processor of a profiling system. The method comprises: based on a document corpus containing a plurality of documents, creating a topic set, at least some of the topics in the topic set being organized in a hierarchical structure which includes a plurality of topic levels including an upper topic level and a lower topic level, each topic in the lower topic level being a subtopic of at least one of the topics in the upper topic level; monitoring interest in a plurality of documents for a user to identify one or more documents-of-interest to the user; and based on the monitored interest for the user, creating an interest profile for the user by determining a measure of topical interest for the user for at least one of the topics at the upper topic level and for a subtopic of that topic, the subtopic being at the lower topic level.

In another aspect, the present disclosure provides a profiling system. The profiling system includes a processor and a memory coupled to the processor. The memory stores processor executable instructions which, when executed by the processor cause the processor to: based on a document corpus containing a plurality of documents, create a topic set, at least some of the topics in the topic set being organized in a hierarchical structure which includes a plurality of topic levels including an upper topic level and a lower topic level, each topic in the lower topic level being a subtopic of at least one of the topics in the upper topic level; monitor interest in a plurality of documents for a user to identify one or more documents-of-interest to the user; and based on the monitored interest for the user, create an interest profile for the user by determining a measure of topical interest for the user for at least one of the topics at the upper topic level and for a subtopic of that topic, the subtopic being at the lower topic level.

Other aspects and features of the present application will become apparent to those ordinarily skilled in the art upon review of the following description of specific embodiments of the application in conjunction with the accompanying figures.

Sample Operating Environment

Figure 1:
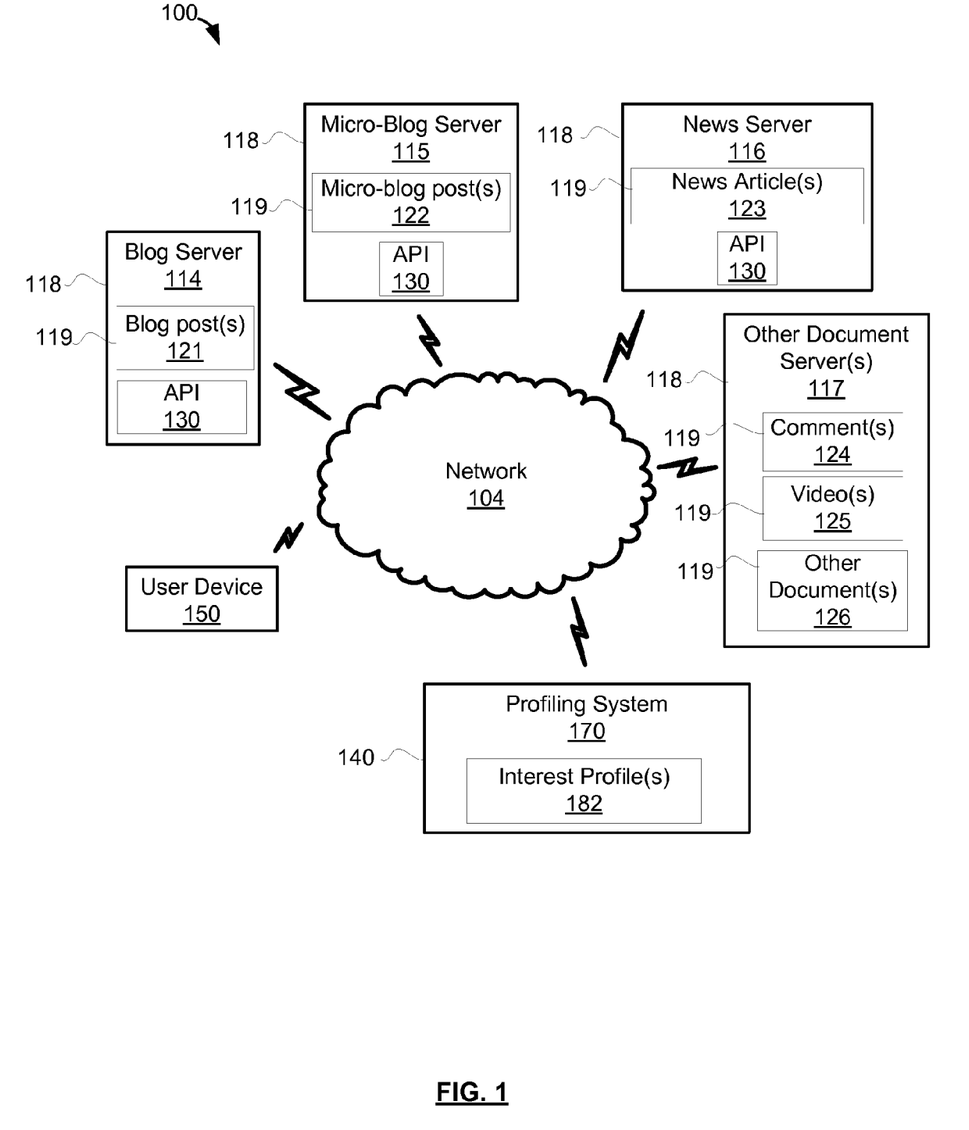
FIG. 1 shows a system diagram illustrating a possible environment in which embodiments of the present application may operate.

Reference is first made to FIG. 1, which illustrates a system diagram of a possible operating environment 100 in which embodiments of the present disclosure may operate.

In the embodiment of FIG. 1, a profiling system 170 is configured to create a user-specific interest profile 182 for one or more users. The interest profile 182 may be used in order to predict a user's interest in a document 119. A user's predicted interest in a document 119 may be used in order to determine whether the document 119 or a portion of the document 119 (such as a title of the document) will be displayed to a user and/or in order to determine how prominently the document 119 will be displayed. For example, the interest profile 182 for a user may be used to determine how high a document 119 should be displayed relative to other documents 119.

In at least some embodiments, the users may each be associated with one or more user devices 150. The user devices 150 may be electronic devices which are connected to the profiling system 170 via a network 104, such as the Internet.

The user devices 150 may, in various embodiments, include any one or more of: smartphones, tablet computers, laptop or netbook style computers, desktop computers, or other electronic devices. The user devices 150 are generally equipped with a display (not illustrated) which may allow the user devices to display one or more documents 119.

The profiling system 170 may create an interest profile 182 for a user based on documents 119 which a user appears to be interested in. That is, the profiling system 170 may monitor user behaviour in order to determine whether a user is interested in a given document 119 and may create an interest profile 182 for the user by analyzing documents 119 which the user appears to be interested in.

In at least some embodiments, the profiling system 170 may connect to or include a document aggregation system 140. In at least some embodiments, the interest profiles 182 which are created by the profiling system 170 may be used by the document aggregation system 140 in order to select and/or prioritize one or more documents 119 or clusters of documents 119 for display to a user of a user device 150. In the embodiment illustrated, the profiling system 170 and the document aggregation system 140 are illustrated as a common system. However, in other embodiments, the profiling system 170 and the document aggregation system 140 may be separate systems which may, for example, communicate via a network 104.

In at least some embodiments, the document aggregation system 140 is configured to analyze at least a portion of a plurality of machine readable documents 119 and to group related documents together. That is, the document aggregation system 140 is configured to obtain document clusters. Each document cluster includes one or more documents 119 which are related to one another. More particularly, in at least some embodiments, the documents 119 in a document cluster are related to one another by subject matter. That is, all of the documents 119 in a given document cluster may be related by virtue of the fact that they all discuss a common story. The story may relate to a topic, issue, or event such as a recent event.

Some document clusters may include a single document 119. This may occur, for example, where none of the other documents 119 analyzed by the document aggregation system 140 are related to the single document 119 in the document cluster. A single document cluster may, however, include a plurality of documents 119. Where a single document cluster includes a plurality of documents 119, all of the documents 119 in that document cluster are related.

The documents 119 which grouped by the document aggregation system 140 and/or which are used by the profiling system 170 to create a user-specific interest profile 182 are machine readable documents 119, such as, for example, text based documents, video, and/or audio. These documents 119 may include, for example, blog posts 121, micro blog posts 122, news articles 123, comments 124, videos 125, and other documents 126. Other types of documents 119 may be used.

The documents 119 which are analyzed by the document aggregation system 140 and which may be included in the document clusters and/or the documents 119 which are used by the profiling system 170 to create interest profiles 182 may, for example, be documents 119 which are associated with one or more document servers 118. In some embodiments, the documents 119 may include one or more blog posts 121. A blog is a website on which an author records opinions, links to other sites, and other content on a regular basis. A blog is a form of online journal which allows user to reflect, share opinions and discuss various topics in the form of an online journal. A blog post 121 is an entry in a blog. In at least some embodiments, the blog posts 121 may be stored on and/or accessed through one or more blog server 114.

The documents 119 which are analyzed by the document aggregation system 140 and which may be included in the document clusters and/or the documents 119 which are used by the profiling system 170 to create interest profiles 182 may, for example, include micro-blog posts 122. A micro-blog is a form of a blog in which the entries to the blog are typically restricted to a predetermined length. By way of example, in at least some embodiments, the micro-blog posts 122 may include Tweets™ on Twitter™. In at least some embodiments, the micro-blog posts 122 may be social networking posts including status updates, such as Facebook™ posts and updates and/or Google™ Buzz™ posts and updates. In at least some embodiments, the micro-blog posts may be restricted to one hundred and forty (140) characters. The micro-blog posts 122 may, in at least some embodiments, be stored on and/or accessed through one or more micro-blog server 115.

The documents 119 which are analyzed by the document aggregation system 140 and which may be included in the document clusters and/or the documents 119 which are used by the profiling system 170 to create interest profiles 182 may, for example, include news articles 123. News articles 123 are text based documents which may, for example, contain information about recent and/or important events. In at least some embodiments, the news articles 123 may be stored on and/or accessed through one or more news servers 116.

The documents 119 which are analyzed by the document aggregation system 140 and which may be included in the document clusters and/or the documents 119 which are used by the profiling system 170 to create interest profiles 182 may include other documents instead of or in addition to the blog posts 121, micro-blog-posts 122 and/or news articles 123. By way of example, in at least some embodiments, the documents 119 may include one or more comments 124, one or more videos 125 and/or one or more other documents 126. Comments 124 may, in at least some embodiments, be documents 119 which are user-generated posts which are input within an interface which allows a user to comment about a primary document. The primary document may, for example, be a blog post 121, micro-blog post 122, news article 123, or video 12. Other types of primary documents may also be used. That is, comments 124 may be remarks which express an opinion or reaction to a primary document. Users may be given the opportunity to submit comments 124 when viewing the primary documents. In at least some embodiments, the comments may be stored on and/or accessed through the blog server 114, micro-blog server 115 or news server 116. In other embodiments, the comments 124 may be stored on and/or accessed through one or more other document servers 117.

The other document servers 117 may, in at least some embodiments, store and/or provide access to one or more videos 125 and/or other documents.

The documents 119 which are analyzed by the document aggregation system 140 and/or the profiling system 170 are machine readable documents. The documents 119 may include, for example, text-based documents which contain data in written form. By way of example and not limitation, the documents 119 may be formatted in a Hyper-Text Markup Language ("HTML") format, a plain-text format, a portable document format ("PDF"), or in any other format which is capable of representing text or other content. Other document formats are also possible.

In at least some embodiments, the documents 119 may include documents 119 which are not text-based documents. Instead, the documents 119 may be documents which are capable of being converted to text based documents. Such documents 119 may include, for example, video or audio files. In such embodiments, the document aggregation system 140, the profiling system 170, or another system, may include a text extraction module which is configured to convert audible speech into written text. Such text may then be analyzed by the document aggregation system 140 in order to obtain the document clusters and/or by the profiling system 170 in order to obtain an interest profile 182 for a user.

Accordingly, in at least some embodiments, the documents 119 are stored on a document server 118 which is accessible to the document aggregation system 140 and/or the profiling system 170. The document aggregation system 140 and/or the profiling system 170 may connect to the document servers 118 via a network 104, such as the Internet. In some embodiments, one or more of the document servers 118 may be a publicly and/or privately accessible web-site which may be identified by a unique Uniform Resource Locator ("URL").

The network 104 may be a public or private network, or a combination thereof. The network 104 may be comprised of a Wireless Wide Area Network (WWAN), a Wireless Local Area Network (WLAN), the Internet, a Local Area Network (LAN), or any combination of these network types. Other types of networks are also possible and are contemplated by the present disclosure.

In at least some embodiments, one or more of the document servers 118 may include an application programming interface (API) 130 which permits the document aggregation system 140 and/or the profiling system 170 to access the documents 119 associated with that document server 118. By way of example, in some embodiments, the blog server 114 may include an API 130 which permits the document aggregation system 140 and/or the profiling system 170 to access blog posts 121 associated with the blog server 114. Similarly, in at least some embodiments, the micro-blog server 115 may include an API 130 which permits the document aggregation system 140 and/or the profiling system 170 to access micro-blog posts 122 associated with the micro-blog server 115. Similarly, in at least some embodiments, the news server 116 may include an API 130 which permits the document aggregation system 140 and/or the profiling system 170 to access news articles 123 associated with the news server 116. In at least some embodiments (not shown), one or more of the other document servers 117 may include an API 130 for permitting the document aggregation system 140 and/or the profiling system 170 to access the documents 119 associated with those other document servers 117.

The API 130 associated with any one or more of the document servers 118 may be configured to provide documents 119 associated with that document server 118 to the document aggregation system 140 and/or the profiling system 170. For example, in at least some embodiments, an API 130 associated with a document server 118 may be configured to receive a request for one or more documents 119 from the document aggregation system 140 and/or the profiling system 170 (or another system) and, in response, retrieve one or more documents 119 from storage and provide the retrieved document(s) to the document aggregation system 140 and/or the profiling system 170 (or other system from which a request was received).

While in some embodiments, the API 130 of one or more of the documents servers 118 may be configured to return documents 119 to a system (such as the document aggregation system 140 and/or the profiling system 170) in response to a request from that system, in other embodiments, one or more of the document servers 118 may provide documents 119 to a system (such as the document aggregation system 140 and/or the profiling system 170) when other criteria is satisfied. For example, one or more of the document servers 118 may, in at least some embodiments, be configured to periodically provide documents 119 to the document aggregation system 140 and/or the profiling system 170. For example, a document server 118 may periodically send to the document aggregation system 140 and/or the profiling system 170 any documents 119 which have been posted since the document server 118 last sent documents 119 to the document aggregation system 140 and/or the profiling system 170 (i.e. it may send new documents 119).

In at least some embodiments, the document aggregation system 140 and/or the profiling system 170 may access the documents 119 on the document servers 118 in other ways. For example, in at least some embodiments, the document aggregation system 140 and/or the profiling system 170 may include web scraping and/or crawling features. In such embodiments, the document aggregation system 140 and/or the profiling system 170 may automatically navigate to a URL associated with a document server 118 and may index and/or retrieve one or more documents 119 associated with that document server 118.

In at least some embodiments, the document aggregation system 140 may be of the type described in United States Publication Number 2011/0093464 A1 which was filed Aug. 17, 2010 and entitled "SYSTEM AND METHOD FOR GROUPING MULTIPLE STREAMS OF DATA," the contents of which are incorporated herein by reference.

The document aggregation system 140 and/or the profiling system 170 may include a number of systems, functions, subsystems or modules apart from those specifically discussed herein. In at least some embodiments, the document aggregation system 140 and/or the profiling system 170 also includes a web-interface subsystem (not shown) for automatically generating web pages which permit access to documents 119 in the document clusters and/or provide other information about such documents 119. The other information may include a machine-generated summary of the contents of the documents 119.

The web-pages which are generated by the web-interface subsystem may provide access to documents 119 in document clusters determined by the document aggregation system 140. More particularly, the web-pages may display document clusters or information associated with document clusters. Each document cluster may represent a story. A user may select a story via the webpage by selecting a document cluster (or by selecting other information associated with a document cluster) and documents 119 associated with that document cluster may then be displayed (or information associated with those documents 119 may be displayed).

In at least some embodiments, the web-interface subsystem (not shown) is configured to generate web pages based on scores assigned to each of a plurality of document clusters and/or documents 119. The web-interface subsystem may generate one or more web-pages for display to a specific user based on a measure of predicted interest for that user for one or more documents 119 and/or document clusters. That is, the prediction system 170 may gauge a user's interest in a document 119 or a document cluster by determining a measure of predicted interest for the user in the document 119 (or document cluster). The measure of predicted interest may be determined based on the interest profile 182 for that user. The web-interface subsystem may use the measure of predicted interest in order to generate web pages containing content which is likely of interest to the user. For example, the web-interface subsystem may generate a web page which includes a link to a document 119 that a user will likely be interested in but which does not include a link to a document 119 which a user will likely not be interested in.

Accordingly, in at least some example embodiments, web-pages generated by a web-interface subsystem may display identification data for documents 119 and/or document clusters having a higher relative measure of predicted interest more prominently than identification data for documents 119 or document clusters having a lower relative measure of predicted interest. For example, in at least some embodiments, the generated web-pages may display identification data for documents 119 or document cluster having a measure of predicted interest at a higher relative position than identification data for documents 119 or document clusters having a lower relative measure of predicted interest.

Accordingly, in some embodiments, the document aggregation system 140 may allow public access to documents 119 and/or document clusters. In some such embodiments, the document aggregation system 140 provides such access by generating web pages which are accessible through a network 104 such as the Internet. For example, user devices 150 may access the web pages. The web pages may visually represent the relationship of documents 119 by subject matter. For example, the web pages may display related documents, portions of related documents 119 and/or or links to related documents 119 (i.e. documents 119 in the same document cluster) on a common web page to indicate that such documents 119 are related. Such related documents 119, portions and/or links may be displayed in close proximity to one another to visually represent the fact that the documents are related to one another.

The profiling system 170 and/or the document aggregation system 140 may in various embodiments, include more or less subsystems and/or functions than are discussed herein. The functions provided by any set of systems or subsystems may be provided by a single system and that these functions are not, necessarily, logically or physically separated into different subsystems and are not, necessarily, logically or physically included in a common system. In the illustrated example, the profiling system 170 and the document aggregation system 140 are a single system which provides both document aggregation capabilities and also profiling capabilities. Such a system may be referred to as a profiling system 170 or a document aggregation system 140 since both document cluster ranking capabilities and document aggregation capabilities are provided. In other embodiments, the profiling system 170 may be physically or logically separated from the document aggregation system 140.

Accordingly, the term profiling system 170 as used herein includes standalone profiling systems which are not, necessarily, part of a larger system, and also profiling systems 170 which are part of a larger system or which include other systems or subsystems. The term profiling system 170, therefore, includes any systems in which the profiling methods described herein are included.

Furthermore, while FIG. 1 illustrates one possible operating environment 100 in which the document cluster ranking system 170 may operate, it will be appreciated that the profiling system 170 may be employed in other systems in which it may be useful to profile user interests.

Example Profiling System

Figure 2:
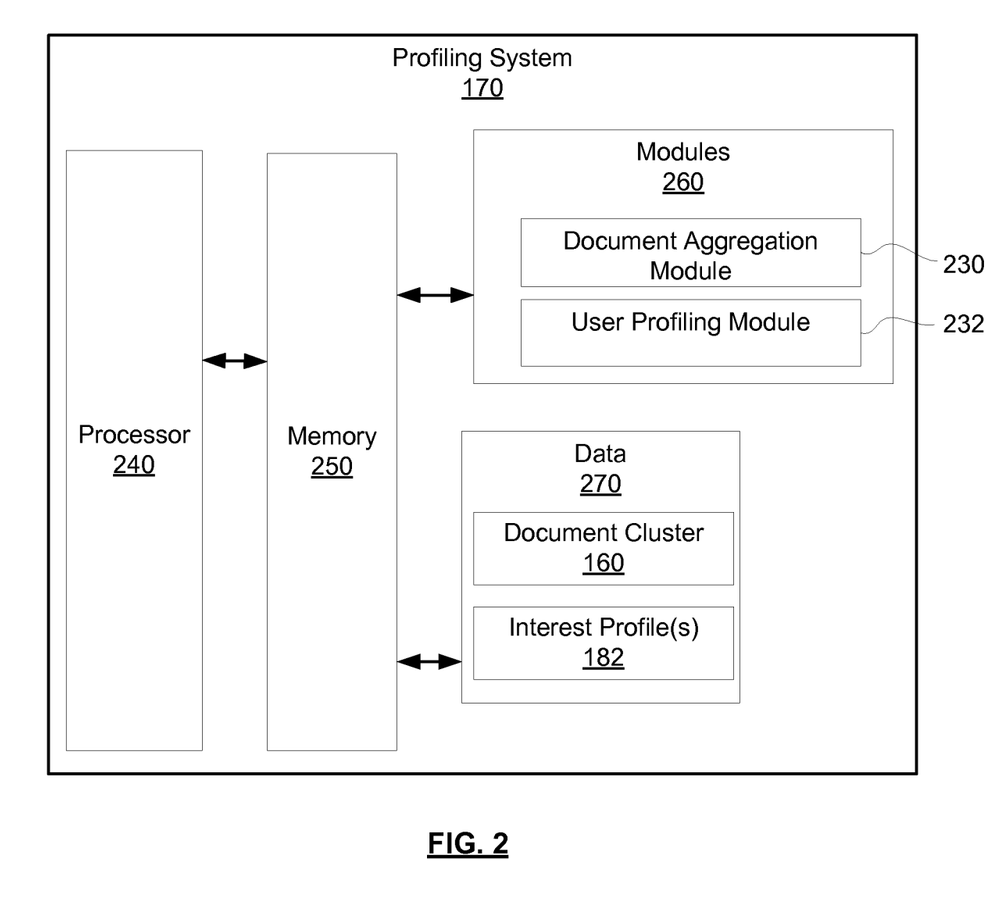
FIG. 2 shows a block diagram of a profiling system in accordance with an embodiment of the present disclosure.

Referring now to FIG. 2, a block diagram of an example profiling system 170 is illustrated. The profiling system 170 includes a controller, comprising one or more processor 240 which controls the overall operation of the profiling system 170.

The profiling system 170 includes a memory 250 which is connected to the processor 240 for receiving and sending data to the processor 240. While the memory 250 is illustrated as a single component, it will typically be comprised of multiple memory components of various types. For example, the memory 250 may include Random Access Memory (RAM), Read Only Memory (ROM), a Hard Disk Drive (HDD), a Solid State Drive (SSD), Flash Memory, or other types of memory. It will be appreciated that each of the various memory types will be best suited for different purposes and applications.

The processor 240 may operate under stored program control and may execute software modules 260 stored on the memory 250. In at least some embodiments, the profiling system 170 also functions as a document aggregation system 140 (FIG. 1). In such embodiments, the modules 260 may include a document aggregation module 230 which is configured to perform the functions of the document aggregation system 140. Example functions of the document aggregation system 140 are discussed above. In at least some embodiments, the document aggregation module 230 is configured to cluster documents 119. A document cluster 160 may, for example, include a plurality of documents 119 which are determined by the document aggregation module 230 to be related to one another. For example, the document aggregation module 230 may find a plurality of documents 119 which are all related to the same subject matter.

In at least some embodiments, the profiling system 170 includes a user profiling module 232. The user profiling module 232 is configured to generate a user-specific interest profile 182 for a user of the profiling system 170 and/or the document aggregation system 140. More particularly, the profiling system 170 is configured to create an interest profile 182 for a user. The interest profile 182 may created by monitoring a user's interest in documents 119 and, based on the user's interest in those documents 119, creating a profile which may be used to predict their interest in other documents 119. That is, the profiling system 170 may determine, based on whether a user liked or disliked a document 119, whether that same user will like or dislike another document 119.

The user profiling module 232 will be discussed in greater detail below with reference to FIGS. 3 to 6. More particularly, methods of creating an interest profile 182 will be discussed below with reference to FIGS. 3 to 6.

In at least some embodiments, the user profiling module 232 may predict a user's interest in a document 119 or document cluster 160 by determining a measure of predicted interest in that document 119 or document cluster 160 based on the interest profile 182 for that user. The measure of predicted interest may be used to determine how prominently a document cluster 160 or document 119 will be displayed. For example, when documents 119 or document clusters (or information about documents 119 or document clusters 160) are displayed in a web page, the documents 119 or document clusters 160 may be ordered according to their respective measures of predicted interest. A document 119 or document cluster 160 with a relatively higher measure of predicted interest may be displayed higher on a web page than a document with a relatively lower measure of predicted interest.

Document clusters 160 and/or interest profiles 182 may, for example, be stored in a data 270 area of memory 250. The document clusters 160 may include documents 119, portions thereof, or identifying information regarding documents 119. That is, in some embodiments, the documents 119 themselves may be locally stored in the memory 250 of the document cluster ranking system 170. In other embodiments, the document clusters 160 may include pointers or links specifying where such documents 119 may be found. For example, in some embodiments, the documents 119 in the document clusters 160 may be stored on a remote server such as the document servers 118 of FIG. 1 and the document clusters 160 may specify the location of the documents 119 (such as an address associated with the document server 118 and the location of the documents 119 on the document server 118).

Each interest profile 182 may include or be associated with user identifying information which may be used to identify a specific user associated with an interest profile. The user identifying information may, for example, include a username, password, name, IP address, or other identifying information associated with a user and/or a user device 150 (FIG. 1).

The memory 250 may also store other data 270 not specifically referred to above.

The profiling system 170 may be comprised of other features, components, or subsystems apart from those specifically discussed herein. By way of example and not limitation, the profiling system 170 will include a power subsystem which interfaces with a power source, for providing electrical power to the profiling system 170 and its components. By way of further example, the profiling system 170 may include a display subsystem for interfacing with a display, such as a computer monitor and, in at least some embodiments, an input subsystem for interfacing with an input device. The input device may, for example, include an alphanumeric input device, such as a computer keyboard and/or a navigational input device, such as a mouse.

The modules 260 may be logically or physically organized in a manner that is different from the manner illustrated in FIG. 2. By way of example, in some embodiments, two or more of the functions described with reference to two or more modules may be combined and provided by a single module. In other embodiments, functions which are described with reference to a single module may be provided by a plurality of modules. Thus, the modules 260 described with reference to FIG. 2 represent one possible assignment of features to software modules. However, such features may be organized in other ways in other embodiments.

Creating and Using an Interest Profile

Figure 3:
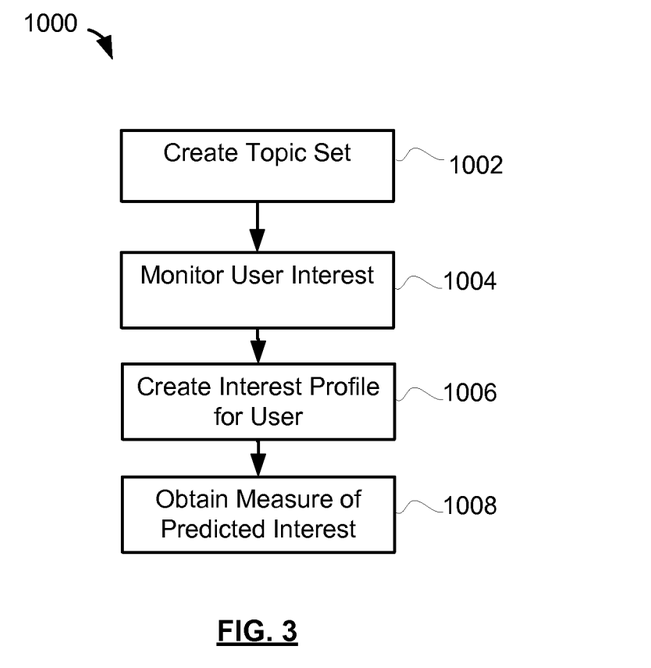
FIG. 3 is a flowchart of an example method for creating and using an interest profile in accordance with example embodiments of the present disclosure.

Referring now to FIG. 3, a flowchart is illustrated of a method 1000 for creating and using an interest profile for a user.

The method 1000 includes steps or operations which may be performed by the profiling system 170. In at least some embodiments, the profiling system 170 may include a memory 250 (or other computer readable storage medium) which stores computer executable instructions which are executable by one or more processor 240 and which, when executed, cause the processor to perform the method 1000 or a portion thereof. In some example embodiments, these computer executable instructions may be contained in one or more module 260 such as, for example, the user profiling module 232 and/or the document aggregation module 230. That is, in at least some example embodiments, one or more of these modules 260 (or other software modules) may contain instructions for causing the processor 240 to perform the method 1000 of FIG. 3.

At 1002, the profiling system 170 may create a topic set based on a document corpus containing a plurality of documents 119. The document corpus is a set of machine readable documents, such as text documents. The documents 119 may, for example, include news articles, blog posts, micro blog posts, comments, or other types of documents 119. In at least some example embodiments, the documents 119 may be formatted in a Hypertext Markup Language (HTML) format. Other document formats may also be used.

In at least some example embodiments, the document corpus may include documents 119 which are obtained from one or more document servers 118 which are connected to the profiling system 170 via a network 104, such as the Internet. The profiling system 170 may retrieve the documents 119 from the document servers 118. In at least some embodiments, the documents 119 forming the document corpus may be stored in memory 250 of the profiling system 170. In at least some such embodiments, at 1002 the profiling system 170 may retrieve the documents 119 from memory.

Accordingly, at 1002, the profiling system 170 may create a topic set. The topics in the topic set are topics which represent the content of at least some of the documents 119 in the document corpus. That is, the topics summarize the content of documents 119.

In at least some example embodiments, the profiling system 170 is configured to create a topic set which is organized in a hierarchical structure. The hierarchical structure includes a plurality of topic levels, including an upper topic level and a lower topic level. Each topic in the lower topic level is a subtopic of at least one of the topics in the upper topic level. That is, the topic set is organized in a hierarchical structure which includes a plurality of topic levels in which at least one topic which is at a lower relative topic level is a subtopic of another topic which is at a higher relative topic level. A topic which is a subtopic of another topic (i.e. a topic at the lower topic level) may be referred to as a child topic and the topic which has a subtopic (i.e. a topic at the upper topic level) may be referred to as a parent topic. A topic set which is organized in a hierarchical structure may be referred to as a hierarchical topic set.

Each subtopic (which may be referred to as a child topic) represents a narrower topic than its parent topic. That is, a topic at a lower topic level is narrower than at least one topic at an upper topic level. By way of example, a parent topic may be a sports topic and a subtopic (i.e. child topic) of that topic may be a hockey topic. In at least some embodiments, all documents 119 which relate to a child topic also relate to the parent topic for that child topic. However, all documents 119 which relate to the parent topic may not relate to one child topic of that parent topic.

In at least some example embodiments, the hierarchical topic set is created by the profiling system 170 to allow subtopics to have progressively narrower subtopics. That is, a topic may have a child topic and may also have a grandchild topic which is a topic which is narrower than the child topic. That is, the hierarchical structure may contain more than two topic levels. For example, in some example embodiments, there are three or more topic levels. For example, in some example embodiments, the hierarchical structure may include an upper topic level, a first lower topic level (which includes subtopics of topics in the upper topic level), and a second lower topic level (which includes subtopics of topics in the upper topic level and in the second lower topic level).

The profiling system 170 may create the topic set so that a topic may also have more than one subtopic. For example, a parent topic may be a sports related topic and that parent topic may have basketball, hockey, golf and baseball related subtopics.

In at least some example embodiments, at 1002 the profiling system 170 may automatically create the topic set. That is, after obtaining the document corpus or a portion thereof, the profiling system 170 may automatically generate the topic set based on the documents 119 without further input or interaction from a user or administrator.

In at least some embodiments, the topics at the upper topic level may be created by the profiling system 170 before the topics at the lower topic level are created by the profiling system 170. That is, the topics which are at the upper topic level may be created and then, following the creation of the topics which are at the upper topic level, topics which are at the lower topic level may be created. In at least some embodiments, the upper topic level may include a plurality of topics.

In at least some example embodiments, a non-negative matrix factorization (NMF) may be applied to the documents 119 in the document corpus in order to create the topic set. In other example embodiments, the topic set may be created by using a graph partitioning algorithm. Other algorithms may be used in other embodiments.

In at least some embodiments, the profiling system 170 may represent a topic as a bag-of-words vector. That is, each topic may be defined by a bag-of-words vector which represents the number of occurrences of words in documents 119 which are included in that topic. Accordingly, the bag-of-words vector which represents the topic may be generated based on the content of documents 119 related to the topic.

In at least some embodiments, the topic set which is created at 1002 is non-user specific. That is, the same topic set may be used to create an interest profile for a plurality of users.

At 1004, the profiling system 170 monitors user interest in a plurality of documents 119 to identify one or more documents-of-interest for the user. That is, the profiling system 170 obtains interest information for a user which indicates the user's interest in the documents 119. The documents may be documents 119 which were included in the document corpus discussed with reference to 1002 or may be other documents 119 which are not included in the document corpus.

At 1004, the profiling system 170 attempts to determine whether a user is interested in each of a plurality of documents 119. As will be described below, such information may be used in order to create an interest profile 182 for the user so that the profiling system 170 (or another system) may predict user interest in other documents 119.

User behaviour in response to one or more documents 119 may be monitored for specific predetermined behaviour which is indicative of user interest in a document 119. For example, the profiling system 170 may provide a user with access to a document 119 (e.g. by presenting a link to the document 119 with a description of the content of the document 119 on a display). If the user accesses the document 119, the profiling system 170 may determine that the user is interested in the document 119. If, however, the user does not access the document 119, then the profiling system 170 may determine that the user is not interested in the document 119. A document which a user is determined to be interested in may be referred to as a document-of-interest.

Similarly, in some example embodiments, the profiling system 170 may monitor the amount of time that a user viewed a document 119. That is, the profiling system 170 may present the document 119 to a user on a display (e.g. a display associated with a user device 150 (FIG. 1)) and may then determine how much time elapsed between the time the document 119 was displayed and the time when the user ceased displaying the document 119. If this time exceeds a predetermined threshold, the profiling system 170 may determine that the user is interested in the document 119. If, however, the time did not exceed the predetermined threshold, then the profiling system 170 may determine that the user is not interested in the document 119.

In at least some example embodiments, the profiling system 170 may determine whether a user is interested in a document 119 based on direct input from the user. For example, in at least some embodiments, the profiling system 170 may receive specific user-generated input from a user indicating whether that user was interested in the document 119. For example, a document 119 may be displayed on a display together with an interface element, such as a "like" button or other icon, which allows a user to specifically indicate their interest in a document 119.

Other indicia not specifically discussed herein may also be used to determine whether a user is interested in a document 119.

After the profiling system 170 gauges user interest in documents 119 (at 1004), at 1006, the interest information for that user may be used in order to create an interest profile 182 for that user. That is, based on the monitored interest for the user, the profiling system 170 creates an interest profile 182 for the user. The creation of the interest profile 182 based on the topic set and the documents-of-interest for the user. Specific techniques for creating an interest profile will be discussed in greater detail below with reference to FIGS. 4 to 6.

As will be explained in greater detail below with reference to FIGS. 4 and 6, the interest profile 182 may include one or more measures of topical interest, which represent a user's interest in one of the topics in the topic set. In at least some embodiments, the interest profile for a user may represent a user's interest in each of the topics in the topic set. That is, the interest profile for a user may include a measure of topical interest for the user for each one of the topics. In at least some embodiments, an interest profile 182 for the user may be created based on the measure of topical interest for the user for at least one of the topics at the upper topic level and for a subtopic of that topic, the subtopic being at the lower topic level.

As will also be explained in greater detail below with reference to FIGS. 4 and 6, in at least some embodiments, the interest profile 182 may also include one or more measures of significance of a topic. A measure of significance for a topic is a measure of how significant that topic is to a user. The measure of significance for a topic may be used to determine whether a user's interest in a topic stems from a user's interest in a subtopic of that topic or whether the user's interest in the topic stems from interest in the topic itself.

As will be explained in greater detail below with reference to FIGS. 5 and 6, in at least some embodiments, the interest profile 182 may also include a heuristic feature profile for a topic. The heuristic feature profile indicates non-content related features which affect a user's interest in a document. The heuristic feature profile may, in at least some embodiments, be included in the measures of topical interest. That is, the measure of topical interest may also include information about heuristic features for documents-of-interest related to the topic and also information about the content of such documents-of-interest.

After an interest profile is created, at 1008, the interest profile may be used in order to predict a user's interest in a document 119 (or in a document cluster 160). That is, the profiling system 170 may determine a measure of predicted interest for a user in a document 119 (or a document cluster 160) based on the interest profile 182 for that user.

In at least some embodiments, the profiling system 170 may determine the measure of predicted interest, $PI_{d,u}$, in a document, d, for a user, u, according to a predicted interest equation:

$$PI_{d,u} = \Sigma_{i \in T} SL_{d,t_i} \cdot MTI_{u,t_i} \cdot w_{u,t_i},$$

where $PI_{d,u}$ is a measure of predicted interest for the document, d, and a user, u, T is a topic set, t is a topic in the topic set, $w_{u,t_i}$ is a measure of significance of a topic for a user, $MTI_{u,t_i}$ is a measure of topical interest of a user in a topic, $SL_{d,t_i}$ is a measure of similarity for the document and a topic and may, in at least some embodiments, be determined as:

$$SL_{d,t} = \frac{x_d \cdot x_{t_i}}{|x_d| \cdot |x_{t_i}|},$$

where $x_d$ is a vector representing the content of the document, such as a bag of words vector (which may be determined based on the number of occurrences of each word in the document) and which may, in some embodiments, represent heuristic features of the document, $x_{t_i}$ is a vector representing the content of the topic such as a bag of words vector for the topic (which may be determined based on the number of occurrences of each word in documents which are members of the topic) and which may, in some embodiments, represent a per-topic heuristic feature profile for the user, $|x_d|$ is a level two norm of the vector representing the content of the document, and $|x_{t_i}|$ is a level two norm of the vector representing the content of the topic.

Creating Interest Profile

Figure 4:
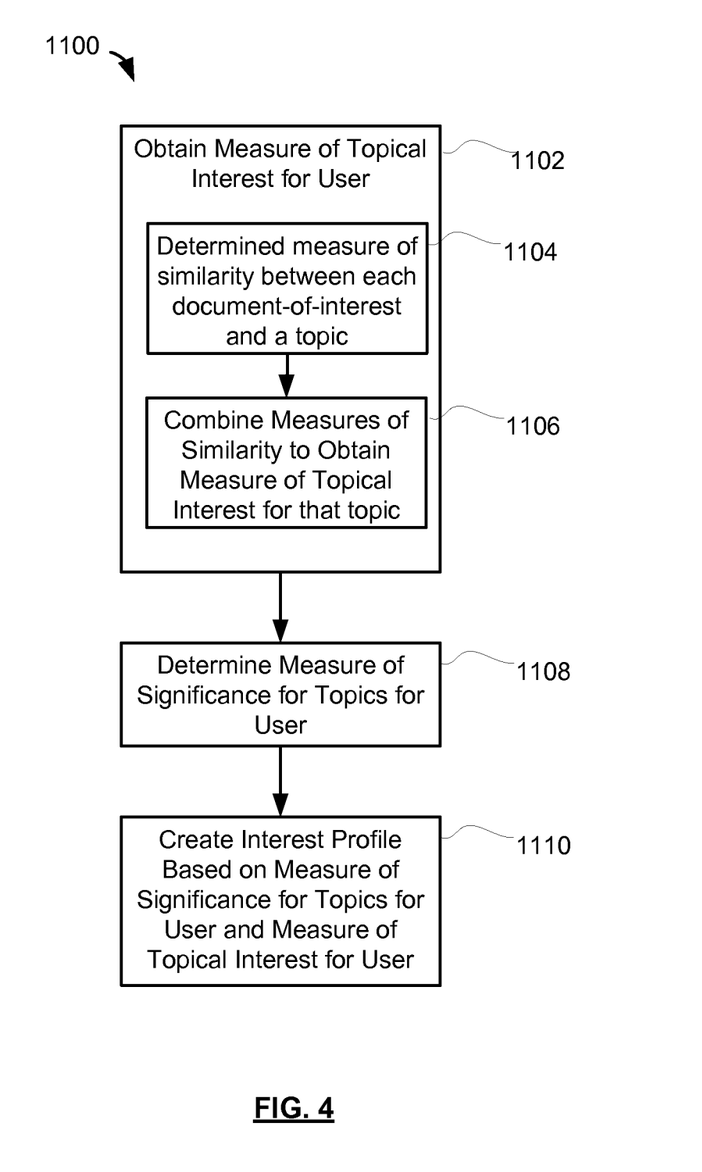
FIG. 4 is a flowchart of a method for creating an interest profile in accordance with example embodiments of the present disclosure.

Referring now to FIG. 4, a method 1100 for creating an interest profile 182 will be discussed. The method 1100 may, in at least some embodiments, be performed at 1006 of FIG. 3.

The method 1100 includes steps or operations which may be performed by the profiling system 170. In at least some embodiments, the profiling system 170 may include a memory 250 (or other computer readable storage medium) which stores computer executable instructions which are executable by one or more processor 240 and which, when executed, cause the processor to perform the method 1100 or a portion thereof. In some example embodiments, these computer executable instructions may be contained in one or more module 260 such as, for example, the user profiling module 232 and/or the document aggregation module 230. That is, in at least some example embodiments, one or more of these modules 260 (or other software modules) may contain instructions for causing the processor 240 to perform the method 1100 of FIG. 4.

At 1102, the profiling system 170 may determine a measure of topical interest for a user. The measure of topical interest is a measure of the degree to which a user may be interested in a topic. That is, the measure of topical interest may indicate whether a user is or is not interested in a topic. In at least some embodiments, the measure of topical interest for a topic is determined by comparing the content of each document-of-interest (i.e. all document 119 which the user being profiled appeared to be interested in) to that topic. That is, the profiling system 170 may compare the content of each document-of-interest to the content of the topic.

In at least some embodiments, when comparing the content of a document-of-interest to a topic, the profiling system 170 may, at 1104, determine a measure of similarity between each document-of-interest and the topic. That is, the profiling system 170 may attempt to determine the degree to which the content of each of the documents which the user appeared to be interested in is similar to the topic. In at least some embodiments, the measure of similarity between a document-of-interest and a topic may be determined as a cosine similarity. That is, for each document 119 that a user appears to be interested in (i.e. for each "document-of-interest"), the profiling system 170 may determine a measure of similarly between the document 119 and the topic by determining a cosine similarity between the document 119 and the topic.

In at least some embodiments, the measure of similarity, $SL_{d,t}$, for a document-of-interest, d, and a topic, t, may be determined as:

$$SL_{d,t} = \frac{x_d \cdot x_t}{|x_d| \cdot |x_t|}$$

where $x_d$ is a vector representing the content of the document-of-interest, such as a bag of words vector (which may be determined based on the number of occurrences of each word in the document), $x_t$ is a vector representing the content of the topic such as a bag of words vector for the topic (which may be determined based on the number of occurrences of each word in documents which are members of the topic), $|x_d|$ is a level two norm of the vector representing the content of the document, and $|x_t|$ is a level two norm of the vector representing the content of the topic.

After the profiling system 170 has determined the measure of similarity between each document-of-interest and a given topic, the profiling system may obtain an overall measure of topical interest for a user in that topic by combining (at 1106) all of the measures of similarity for that topic. That is, the profiling system 170 may take the measures of similarity created based on all of the documents-of-interest and the topic and may combine these measures of similarity in order to create the measure of topical interest.

That is, the measure of topical interest, $MTI_{u,t}$ for a topic, t, and a user, u, may be determined based on all of the documents-of-interest (i.e. based on all of the documents which the user appeared to be interested in). In at least some embodiments, the measure of topical interest for a topic may be determined as a mean of the measures of similarity for each of the documents-of-interest and the topic. For example, the measure of topical interest for a topic may be determined as a mean value of all of the measure of similarity vectors for the topic.

While FIG. 4 illustrates 1102 as being performed with respect to a single topic, in practice 1102 may be performed for multiple topics in order to obtain a measure of topical interest for a user for multiple topics. Accordingly, in at least some embodiments, a measure of topical interest may be obtained for all topics in the topic set (e.g. 1102 may be repeated for all topics). In at least some embodiments, the profiling system 170 may determine a measure of topical interest for a user for at least one topic at the upper topic level and may also determine a measure of topical interest for the same user for at least one subtopic of that topic. That is, the profiling system 170 may determine a measure of topical interest for topics which are both at the upper topic level and topics which are at the lower topic level (or which are at other topic levels).

The multi-leveled structure (i.e. hierarchical structure) of the topic set, may allow the profiling system 170 to pinpoint whether a user's interest in a topic at an upper topic level is caused by the user's interest in a topic at a lower topic level. By way of example, where an upper level topic relates to sports and a lower level topic relates to hockey, it may appear that the user is interested in sports when in fact they are only interested in a particular sport, such as hockey. The use of a hierarchical structure may permit the profiling system 170 to consider the significance of topics at each level to a user and to use this information when predicting whether the user would be interested in documents 119.

Accordingly, in at least some embodiments, at 1108 the prediction system 170 is configured to determine a measure of significance for one or more of the topics. The measure of significance for a topic may also be referred to as a weight. In at least some embodiments, the measure of significance for a topic may be used to gauge the relative importance of a child topic with regard to its parent topic. That is, the measure of significance of a topic indicates the significance of each topic for a user. For example, the measure of significance may indicate the relative importance of a topic at an upper topic level and a subtopic of that topic.

In at least some embodiments, the measure of significance for a topic may be determined using a machine learning algorithm, such as a machine learning regression algorithm.

In at least some embodiments, for a user, a measure of significance may be determined for each of the topics in the topic set. The measures of significance are, in at least some embodiments, determined based on the documents 119 which a user appeared to be interested in (i.e. the documents-of-interest). That is, the fact that a user was interested in a document 119 may be used in order to determine the measures of significance. Similarly, in at least some embodiments, the measures of significance are determined based on the documents 119 which a user did not appear to be interested in (e.g. the documents which are not documents-of-interest). That is, the fact that a user was not interested in a document 119 may be used in order to determine the measures of significance.

By way of example, in at least some embodiments, the measures of significance may be determined by setting a measure of predicted interest formula to a maximum interest value (e.g. one (1)) for documents 119 which a user appears to be interested in (i.e. documents-of-interest) and setting it to a minimum interest value (e.g. zero (0)) for documents 119 which a user appears to not be interested in.

For example, in at least some embodiments, the measures of significance, $w_{u,t}$, for a user, u, and a topic, t, may be determined by applying a machine learning algorithm to solve the following for $w_{u,t_i}$:

$PI_{d,u} = \Sigma_{i \in T} SL_{d,t_i} \cdot MTI_{u,t_1} \cdot w_{u,t_i} = 1$ for documents, d, which the user appears to be interested in (i.e. documents-of-interest), and $PI_{d,u} = \Sigma_{i \in T} SL_{d,t_i} \cdot MTI_{u,t_1} \cdot w_{u,t_i} = 0$ for documents, d, which the user appears to be not interested in, where $PI_{d,u}$ is a measure of predicted interest for the document, d, and a user, u, T is a topic set, t is a topic in the topic set, $w_{u,t_i}$ is a measure of significance of a topic for a user, $MTI_{u,t_u}$ is a measure of topical interest of a user in a topic, $SL_{d,t_i}$ is a measure of similarity for the document and a topic and may, in at least some embodiments, be determined as:

$$SL_{d,t} = \frac{x_d \cdot x_{t_i}}{|x_d| \cdot |x_{t_i}|}$$

where $x_d$ is a vector representing the content of the document, such as a bag of words vector (which may be determined based on the number of occurrences of each word in the document), $x_{t_i}$ is a vector representing the content of the topic such as a bag of words vector for the topic (which may be determined based on the number of occurrences of each word in documents which are members of the topic), $|x_d|$ is a level two norm of the vector representing the content of the document, and $|x_{t_i}|$ is a level two norm of the vector representing the content of the topic.

That is, the measure of significance may be determined by applying the predicted interest formula (i.e. the formula which may be used to predict interest in a document 119 by obtaining a measure of predicted interest) to documents-of-interest.

At 1110, the profiling system 170 may create the interest profile for a user based on the measure of significance, $w_{u,t}$, for the user, u, created for each topic and based on the measure of topical interest, $MTI_{u,t}$ for the user in each topic.

In at least some embodiments, creating the interest profile 182 for a user may include, at 1110, storing the interest profile to memory associated with the profiling system 170. In at least some embodiments, this may include storing the measure of significance, $w_{u,t}$, for the user created for each topic and/or storing the measure of topical interest, $MTI_{u,t}$ for the user in each topic.

Including Heuristic Feature Information in Interest Profile

In at least some embodiments, one or more heuristic features associated with the documents-of-interest for a user may also be considered when generating an interest profile 182 for that user. Heuristic features are non-content related features which are related to documents 119 which may affect a user's interest in that document. By way of example, in at least some embodiments, a heuristic feature which may be considered when generating an interest profile 182 for a user is a document type. For example, one or more heuristic features may indicate whether a document-of-interest is a blog post, micro-blog post, comment, news article, etc.

An overview having been provided, reference will now be made to FIG. 5 which illustrates a method 1200 for creating an interest profile 182 based on a per-topic heuristic feature profile for a user.

The method 1200 includes steps or operations which may be performed by the profiling system 170. In at least some embodiments, the profiling system 170 may include a memory 250 (or other computer readable storage medium) which stores computer executable instructions which are executable by one or more processor 240 and which, when executed, cause the processor to perform the method 1200 or a portion thereof. In some example embodiments, these computer executable instructions may be contained in one or more module 260 such as, for example, the user profiling module 232 and/or the document aggregation module 230. That is, in at least some example embodiments, one or more of these modules 260 (or other software modules) may contain instructions for causing the processor 240 to perform the method 1200 of FIG. 5. The method 1200 may, in at least some embodiments, be performed at 1006 of FIG. 3.

At 1202, one or more heuristic feature values may be determined for each document-of-interest for a user. In at least some embodiments, one or more of the heuristic feature values may be determined based on the document type for a document-of-interest. In at least some embodiments, the heuristic feature value is a number which is assigned based on the document type for a document-of-interest. For example, in at least some embodiments, a heuristic feature vector may be determined for a document-of-interest. The heuristic feature vector may include a plurality of heuristic feature values at predetermined positions within the heuristic feature vector. Each heuristic feature value may correspond to a different heuristic feature. For example, in at least some embodiments, a heuristic feature value at one position may be set to one if a document-of-interest is a blog post (or zero if it is not a blog post), another heuristic feature value at another position may be set to one if the document-of-interest is a micro-blog post (or zero if it is not a micro-blog post), another heuristic feature value at another position may be set to one if the document-of-interest is a comment (or zero if it is not a comment), another heuristic feature value at another position may be set to one if the document-of-interest is a news article (or zero if it is not a news article). Other heuristic feature values at other positions may be set based on other heuristic features not specifically discussed above.

As noted previously, the heuristic feature values for documents-of-interest may be considered when generating an interest profile 182 for a user. For example, the profiling system 170 may, in at least some embodiments, generate an interest profile 182 based on the heuristic feature values for the documents-of-interest.

A user's interest in a documents related to a topic may, at least in part, depend on heuristic features associated with those documents 119. For example, a user may prefer documents 119 of one document type when viewing documents which are related to one of the topics and may prefer documents 119 of another document type when viewing documents which are related to another one of the topics. That is, a user's interest in a document may not solely depend on the content of the document; it may also depend on heuristic features such as the document-type associated with the document.

In at least some embodiments, the profiling system may, at 1204, create a per-topic heuristic feature profile for the user. The per-topic heuristic feature profile for a user specifies the degree to which documents-of-interest for a user associated with a topic accord with certain heuristic features. For example, the per-topic heuristic feature profile for a user may specify the degree to which documents-of-interest for a user associated with a topic tend to be blog posts.

Accordingly, in at least some embodiments, heuristic features which reflect the type of documents which a user is interested in are profiled on a per-topic basis. For example, for each topic, the profiling system may independently determine the type of documents that a user is interested in for that topic. For example, a user may prefer traditional news sources for a weather related topic (and may not prefer comments, blog posts and/or micro blog posts), but may prefer blogs for a sports related topic (and may not prefer traditional news sources).

Next, at 1206, an interest profile 182 may be created for a user based on the per-topic heuristic feature profile for the user. In at least some embodiments, this may include storing the per-topic heuristic feature profile for the user to memory.
Create Interest Profile Based on Content of Documents-of-Interest and Heuristic Features While FIG. 4 illustrated an example embodiment in which an interest profile 182 for a user was created based on the content of documents-of-interest for that user, and FIG. 5 illustrated an example embodiment in which an interest profile 182 for a user was created based on heuristic features associated with documents-of-interest, in at least some example embodiments, an interest profile for a user may be created based on both the content of documents-of-interest and heuristic features for those documents-of interest. For example, the profiling system 170 may create an interest profile for a user based on the content of documents that the user liked and also based on the type of documents that the user liked.

Figure 5:
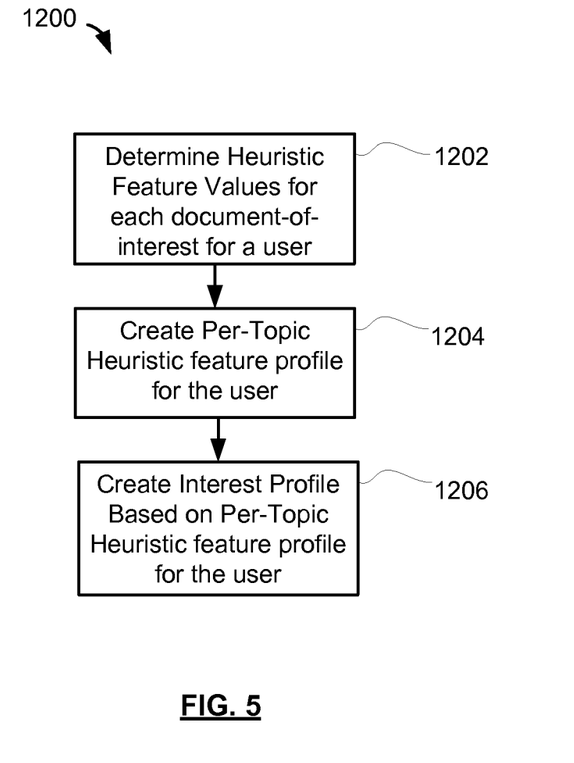
FIG. 5 is a flowchart of a method for creating an interest profile in accordance with example embodiments of the present disclosure.
Figure 6:
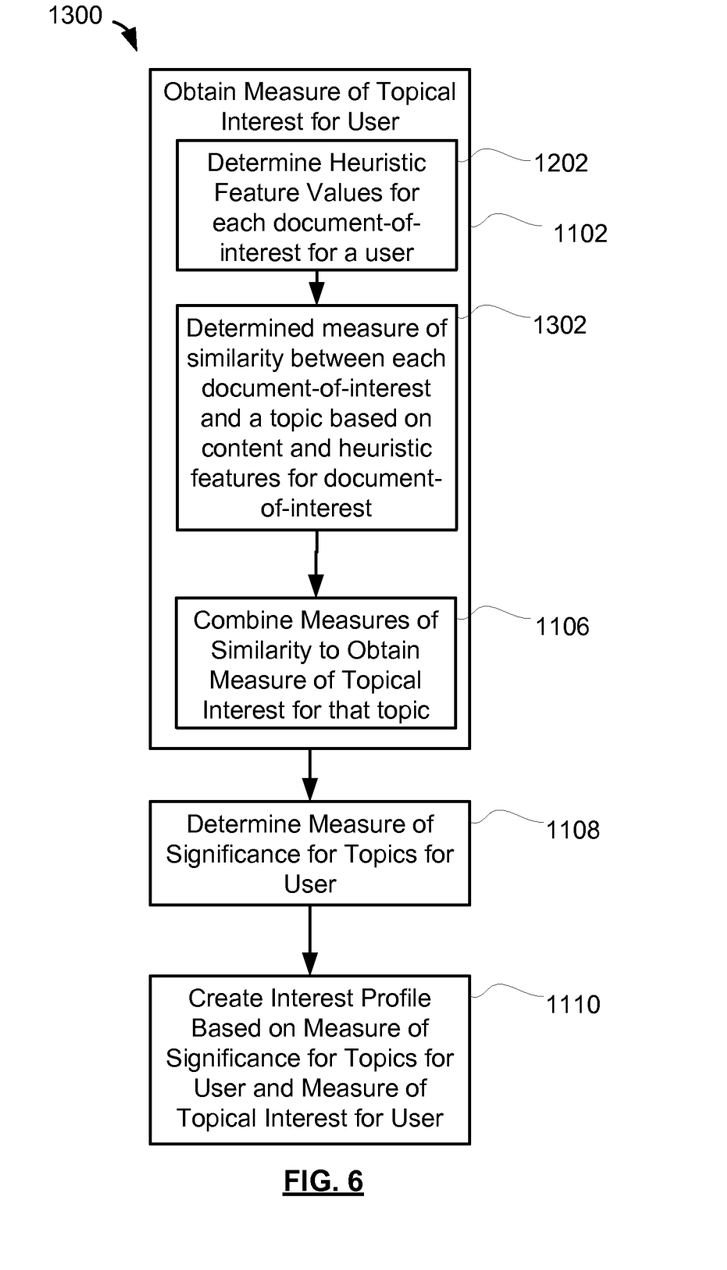
FIG. 6 is a flowchart of a method for creating an interest profile in accordance with example embodiments of the present disclosure.

Referring now to FIG. 6, one such embodiment is illustrated. FIG. 6 illustrates a method 1300 for creating an interest profile. The method 1300 includes some features described above with reference to the method 1100 of FIG. 4 and the method 1200 of FIG. 5.

The method 1300 includes steps or operations which may be performed by the profiling system 170. In at least some embodiments, the profiling system 170 may include a memory 250 (or other computer readable storage medium) which stores computer executable instructions which are executable by one or more processor 240 and which, when executed, cause the processor to perform the method 1300 or a portion thereof. In some example embodiments, these computer executable instructions may be contained in one or more module 260 such as, for example, the user profiling module 232 and/or the document aggregation module 230. That is, in at least some example embodiments, one or more of these modules 260 (or other software modules) may contain instructions for causing the processor 240 to perform the method 1300 of FIG. 6. The method 1300 may, in at least some embodiments, be performed at 1006 of FIG. 3.

At 1102, the profiling system 170 may determine a measure of topical interest for a user. The measure of topical interest is a measure of the degree to which a user may be interested in a topic. That is, the measure of topical interest may indicate whether a user is or is not interested in a topic. The measure of topical interest, in the example of FIG. 6 is configured to also act as a per-topic heuristic feature profile for the user.

At 1202, heuristic feature values for each document-of-interest may be determined in the manner described above with reference to FIG. 5. Next, at 1302, a measure of similarity between each document-of-interest and a topic may be determined based on the content of the document-of-interest and one or more heuristic features associated with the document-of-interest.

In some embodiments, at 1302, the measure of similarity, $SL_{d,t}$, for a document-of-interest, d, and a topic, t, may be determined as:

$$SL_{d,t} = \frac{x_d \cdot x_t}{|x_d| \cdot |x_t|}$$

where $x_d$ is a vector representing the content of the document-of-interest, such as a bag of words vector (which may be determined based on the number of occurrences of each word in the document) and also represents one or more heuristic features, $x_t$ is a vector representing the content of the topic such as a bag of words vector for the topic (which may be determined based on the number of occurrences of each word in documents which are members of the topic) and includes one or more heuristic feature values (which may be initialized to one (1), for example), $|x_d|$ is a level two norm of the vector representing the content of the document and the heuristic features, and $|x_t|$ is a level two norm of the vector representing the content of the topic and the heuristic features.

Next, at 1106, the measures of similarity for all of the documents of interest for a user and topic may be combined in the manner described above with reference to FIG. 4 to obtain a measure of topical interest.

1302 and 1106 effectively perform the function of 1204 of FIG. 5 since these steps obtain a measure of topical interest which considers heuristic features associated with documents which a user was interested in and thus obtain a per-topic heuristic feature profile for the user.

Next, at 1108, one or more measures of significance for the topics may be determined, for the user in the manner described above with reference to FIG. 4 and at 1110 an interest profile may be created in the manner described above with reference to FIG. 4.

While the present disclosure describes methods, a person of ordinary skill in the art will understand that the present disclosure is also directed to various apparatus, such as a server and/or a document processing system (such as a profiling system 170), including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus and articles of manufacture also come within the scope of the present disclosure.

While the methods 1000, 1100, 1200, 1300 of FIGS. 3 to 6 have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

The various embodiments presented above are merely examples. Variations of the embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method implemented by a processor of a profiling system, the method comprising:
    based on a document corpus containing a plurality of documents, creating a topic set, at least some of the topics in the topic set being organized in a hierarchical structure which includes a plurality of topic levels including an upper topic level and a lower topic level, each topic in the lower topic level being a subtopic of at least one of the topics in the upper topic level;
    monitoring interest in a plurality of documents for a user to identify one or more documents-of-interest to the user; and
    based on the monitored interest for the user, creating an interest profile for the user by:
        determining a measure of topical interest for the user for at least one of the topics at the upper topic level and for a subtopic of that topic, the subtopic being at the lower topic level; and
        determining, by the processor, a per-topic heuristic feature profile for the user, the per-topic heuristic feature profile indicating non-content related features which affect a user's interest in a document by specifying, for at least one topic of the topic set, an effect of document type on the user's interest in documents associated with the at least one topic, wherein the document type is one or more of: a blog post, a micro-blog post, a comment, or a news article.

2. The method of claim 1, further comprising: determining a measure of predicted interest in a document based on the interest profile for the user.

3. The method of claim 1, wherein each topic in the topic set is represented by a bag-of-words vector.

4. The method of claim 3, wherein the bag-of words vector is generated based on the content of documents related to the topic.

5. The method of claim 1, wherein determining a measure of topical interest comprises: comparing the content of each document-of-interest to one of the topics.

6. The method of claim 5, wherein comparing the content of each document-of-interest to one of the topics comprises: obtaining a measure of similarity between each document-of-interest and the topic.

7. The method of claim 6, wherein the measure of topical interest for the user and one of the topics is determined based on the measure of similarity between each document-of-interest and the topic.

8. The method of claim 6, wherein the measure of similarity is a cosine similarity between the document-of-interest and the topic.

9. The method of claim 1, further comprising: determining a measure of significance for the user for at least one of the topics at the upper topic level and for a subtopic of that topic, the subtopic being at the lower topic level.

10. The method of claim 9, wherein the measure of significance is determined for each topic in the topic set.

11. The method of claim 9, wherein the measure of significance indicates the relative importance of the topic at the upper topic level and the subtopic of that topic for the user.

12. The method of claim 11, wherein the measure of significance is determined by applying a predicted interest formula, which finds a measure of predicted interest, to documents-of-interest and by setting the measure of predicted interest for documents-of-interest to a maximum value, the predicted interest formula including the measure of significance.

13. The method of claim 1, wherein the heuristic feature profile specifies per-topic interest in any one or more of the following document types: blog posts, comments, news articles, or micro-blog posts.

14. The method of claim 1, wherein monitoring interest in a plurality of documents for a user comprises: receiving direct user-generated input from the user indicating whether that user was interested in a document.

15. A profiling system comprising:
    a processor; and
    a memory coupled to the processor, the memory storing processor executable instructions which, when executed by the processor cause the processor to:
        based on a document corpus containing a plurality of documents, create a topic set, at least some of the topics in the topic set being organized in a hierarchical structure which includes a plurality of topic levels including an upper topic level and a lower topic level, each topic in the lower topic level being a subtopic of at least one of the topics in the upper topic level;
        monitor interest in a plurality of documents for a user to identify one or more documents-of-interest to the user; and based on the monitored interest for the user, create an interest profile for the user by:
- determining a measure of topical interest for the user for at least one of the topics at the upper topic level and for a subtopic of that topic, the subtopic being at the lower topic level; and
- determining a per-topic heuristic feature profile for the user, the per-topic heuristic feature profile indicating non-content related features which affect a user's interest in a document by specifying, for at least one topic of the topic set, an effect of document type on the user's interest in documents associated with the at least one topic, wherein the document type is one or more of: a blog post, a micro-blog post, a comment, or a news article.

16. The profiling system of claim 15, wherein the processor executable instructions are further configured to cause the processor to: determine a measure of predicted interest in a document based on the interest profile for the user.

17. The profiling system of claim 16, wherein determining a measure of topical interest comprises: comparing the content of each document-of-interest to one of the topics.

18. The profiling system of claim 17, wherein comparing the content of each document-of-interest to one of the topics comprises: obtaining a measure of similarity between each document-of-interest and the topic.

19. The profiling system of claim 18, wherein the measure of topical interest for the user and one of the topics is determined based on the measure of similarity between each document-of-interest and the topic.

20. The profiling system of claim 18, wherein the measure of similarity is a cosine similarity between the document-of-interest and the topic.

21. The profiling system of claim 15, wherein each topic in the topic set is represented by a bag-of-words vector.

22. The profiling system of claim 21, wherein the bag-of-words vector is generated based on the content of documents related to the topic.

23. The profiling system of claim 15, wherein the processor executable instructions are further configured to cause the processor to: determine a measure of significance for the user for at least one of the topics at the upper topic level and for a subtopic of that topic, the subtopic being at the lower topic level.

* * * * *